UNITED STATES PATENT OFFICE.

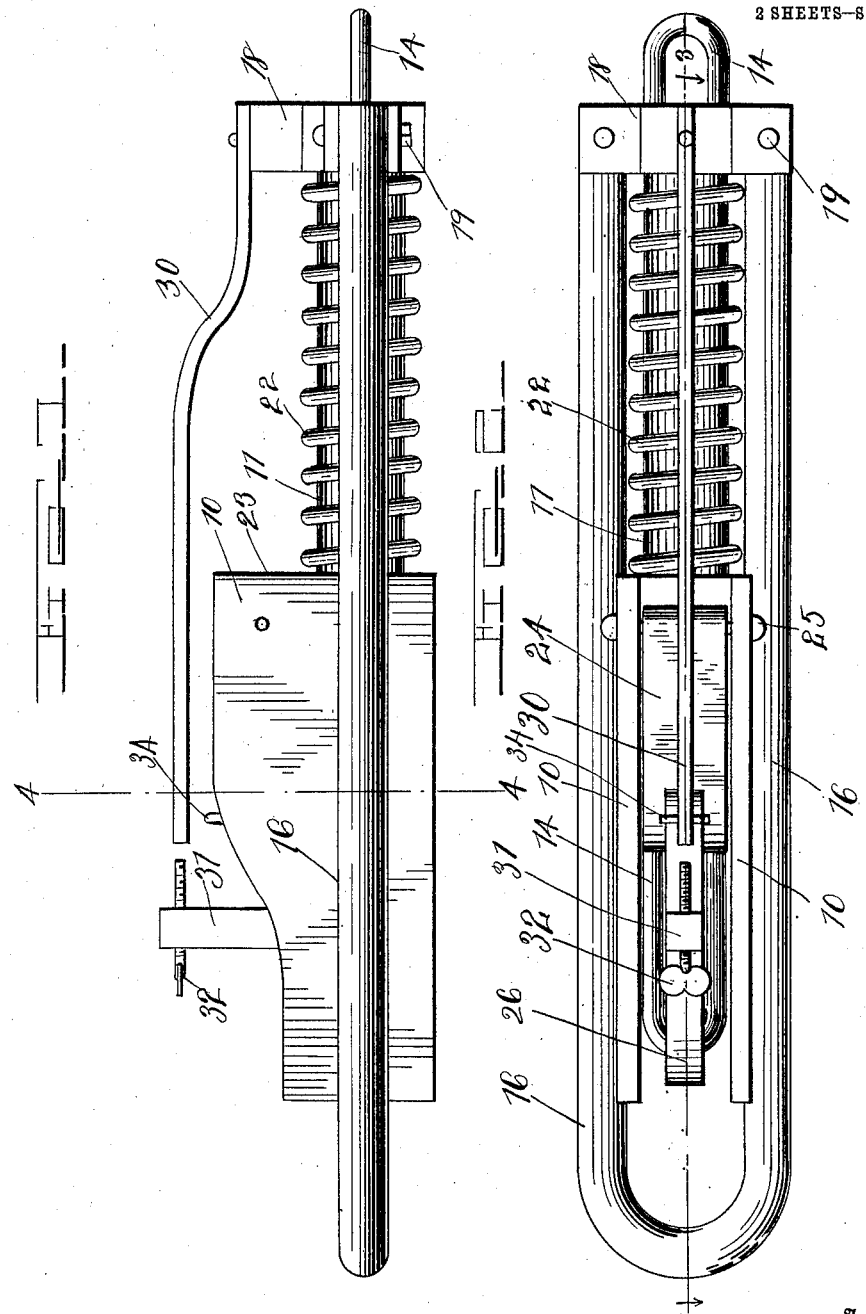

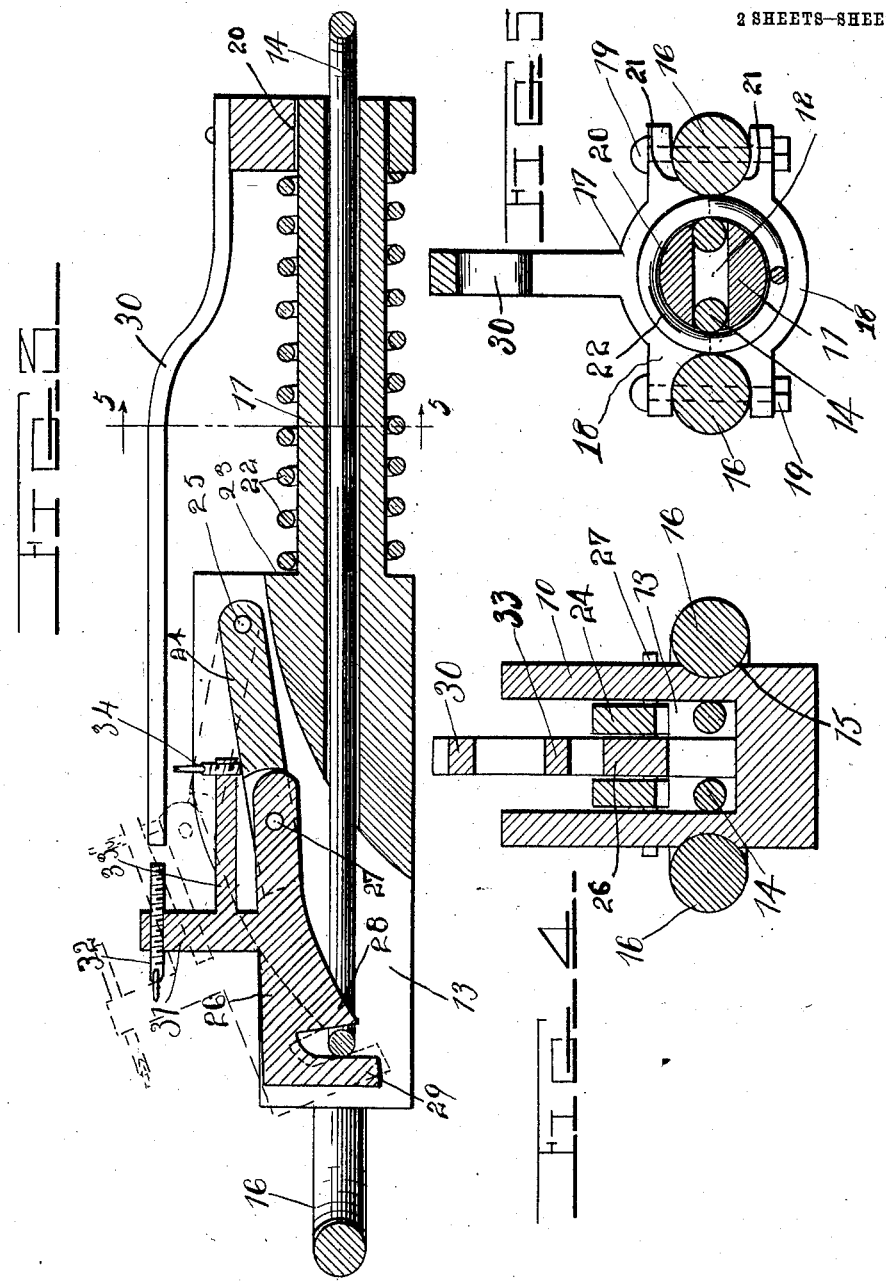

CHARLES V. KULLER, OF JUDSON, NORTH DAKOTA.

AUTOMATIC LOCKING BREAK-PIN.

1,006,567.  Specification of Letters Patent.  Patented Oct. 24, 1911.

Application filed November 4, 1910. Serial No. 590,708.

*To all whom it may concern:*

Be it known that I, CHARLES V. KULLER, a citizen of the United States, residing at Judson, in the county of Morton, State of North Dakota, have invented certain new and useful Improvements in Automatic Locking Break-Pins; and I do hereby declare the following to be a full, clear, and exact description of the invention, such as will enable others skilled in the art to which it appertains to make and use the same.

This invention relates to that class of couplings commonly known as break pins and has for an object to provide a break pin for use in attaching a gang plow to a traction engine or other motor vehicle, the pin breaking when the plow strikes a stone, stump or other obstacle and freeing the engine.

An object of the invention is to provide a break-pin that will be positive in its action and when the breaking of the pin has taken place to free the traction the parts may readily be assembled again to attach the plow to the engine after the former has been disengaged from the stump or other obstacle.

A further object of the invention is to provide novel adjusting means so that the pin may be adjusted to break at any predetermined strain.

With the above objects in view the invention consists in the novel details of construction and combination of parts hereinafter fully described and claimed, it being understood that various modifications may be made in the form, proportion and minor details of construction within the scope of the appended claims.

In the accompanying drawings forming part of this specification, Figure 1 is a side elevation of my improved break pin, Fig. 2 is a plan view of the pin, Fig. 3 is a longitudinal sectional view taken on the line 3—3 of Fig. 2, Fig. 4 is a cross-sectional view taken on the line 4—4 of Fig. 1, Fig. 5 is a cross sectional view taken on the line 5—5 Fig. 3.

Referring now to the drawings in which like characters of reference indicate like parts in the views shown, the pin is seen to comprise a body portion 10 which is approximately rectangular in contour and cross-section and is provided on one end face with a reduced circular extension 11, this extension having an axial slot 12, this slot opening at its inner end into an interior orifice 13 formed in the body portion 10, this interior orifice being sufficient in extent to open out through that end of the body portion remote from the extension and the orifice coöperates with the slot in the extension to receive an elongated continuous loop bar 14, this bar receiving in its loop the coupling pin carried by either the traction engine or the gang plow. The body portion 10 and the bar 14 are yieldingly locked together as will hereinafter be described and are adapted to be broken apart by a hereinafter described tripping means, that operates to release the locking nut mechanism, it being understood that the body portion 10 is attached to the traction engine when the bar is attached to the plow; and the bar is attached to the traction engine, when the body portion is attached to the plow.

Slidably fitted in grooves 15 formed in the side of the body 10 are the legs of a U-shaped attaching bar 16, the legs of this bar being greater in extent than the combined lengths of the body portion 10 and the extension 11 and being connected at their terminals by a bearing box 17 which loosely receives the extension 11, this bearing box being preferably formed of two separate oppositely bowed plates 18, the terminals of which overlie and are bolted together as shown at 19, each plate being formed with a semi-circular rabbet 20 which conforms to the contour of the extension 11 and each plate being further provided with a pair of semi-circular rabbets 21 arranged on opposite sides of the extension receiving rabbet and coöperating with similarly disposed rabbets in the mating plate to receive the terminals of the attaching bar 16, the bolts 19 which secure the plates together being passed through the legs of the attaching bar and rigidly securing all of the parts together. It is clear that the bearing box 17 may slide longitudinally upon the extension 11 and to hold the bearing box upon the outer end of this extension a helical spring 22 is seated on the extension 11, the opposite terminals of this spring bearing against the bearing box 17 and opposing face 23 of the body portion. This spring stores up energy as the bearing box is moved in the direction of the body portion to return the bearing box to its initial position when the latter is released.

For locking the attaching bars 14 and 16 together, a link 24 is pivotally connected to the inner walls of the orifice 13 in the body portion, as shown at 25, the free end of this link being bifurcated. A catch 26 formed from an approximately straight bar of metal is inserted between the branches of the bifurcated link and pivotally connected thereto as shown at 27, the free end of this catch being provided with a pair of spaced ears 28 and 29, one of these ears 29 being arranged at the extreme end of the catch and being slightly greater in length than the mating ear 28. Between these ears one terminal of the continuous loop attaching bar 14 is engaged and when in this position the catch will assume the position shown in Fig. 3. Both attaching bars 14 and 16 are now locked together. For tripping the catch 26 a finger 30 is fixed to the top face of the bearing box 18 and extends forwardly over the body portion and overlies the pivoted end of the catch. Arranged upon the top face of the catch is an upstanding lug 31 one face of which confronts the extreme free end of the finger 30. An elongated set screw 32 is threaded to the free extremity of this lug the shank of this set screw normally abutting the extreme end of the finger. When the finger is moved forwardly by virtue of the attaching bar 16 being pulled outwardly from the body portion thereby advancing the bearing box along the extension 11 against the pressure of the spring 22, the finger will push forwardly the lug 31 thereby elevating the pivoted end of the catch as shown in dotted lines in Fig. 3 and when this is done the rearmost ear 28 of the catch will have been entirely freed from engagement with the attaching bar 14 so that the latter is free to escape. It will be observed by advancing or retracting the set screw in the lug 31 that the breaking operation of the device may be timed. In order to positively lock the catch against being slipped so that the device may be used as a single integral coupling an arm 33 is arranged to project laterally from that face of the lug 31 which confronts the finger 30, this lug being equipped at its lower extremity with a set screw 34 which may be advanced up into engagement with the opposing face of the link 24. The set screw is now advanced until the link 24 and catch 26 form an approximate V and in this position of the parts a push of the finger 30 upon the set screw 32 will only serve to cause the pivot 27 that connects the link and latch to become inoperative as a pivot since the pull upon the bar 14 which tends to cause the pivoted ends of the link and catch to sink still lower will be counter-balanced by the pull upon the draft iron 16 which tends to cause the pivoted end to rise with the result that the catch remains stationary and locks the bar 14 against displacement.

What is claimed is:—

1. A coupling comprising a longitudinally orificed stationary member, a sliding attaching member disposed in the orifice of said stationary member, a spring controlled sliding attaching member extending longitudinally of and externally of said stationary member, a yielding catch carried by said stationary member lockingly engaging the first named sliding member to the stationary member, and tripping means carried by the spring controlled sliding member operating to release said catch upon predetermined outward movement of said sliding members relatively to each other.

2. A coupling comprising a longitudinally slotted stationary member, a continuous loop attaching member slidably mounted within the slot of said stationary member, a U-shaped attaching member longitudinally straddling said stationary member, means connecting the terminals of said U-shaped member and slidably fitted on said stationary member, a spring carried by said stationary member bearing against the terminal connecting means of the U-shaped member and operating to hold the U-shaped member in a predetermined position upon said stationary member, a yielding catch carried by said stationary member locking said continuous loop member to said stationary member, and a tripping finger carried by said U-shaped member operating to release said catch upon a predetermined movement of the U-shaped member along said stationary member.

In testimony whereof, I affix my signature, in presence of two witnesses.

CHARLES V. KULLER.

Witnesses:
 FERD RINGOEN,
 WM. PEIKER.

---

Copies of this patent may be obtained for five cents each, by addressing the "Commissioner of Patents, Washington, D. C."